United States Patent
Siess et al.

(10) Patent No.: US 10,968,130 B2
(45) Date of Patent: Apr. 6, 2021

(54) METHOD AND DEVICE FOR TREATING WASTEWATER CONTAINING ORGANIC MATTER AND/OR WET WASTE CONTAINING ORGANIC MATTER, IN PARTICULAR FOR TREATING SANITARY WASTEWATER IN TRAINS

(71) Applicant: AKW A+V PROTEC HOLDING GMBH, Hirschau (DE)

(72) Inventors: Daniel Siess, Schwandorf (DE); Josef Schärtl, Schnaittenbach (DE)

(73) Assignee: AKW A+V PROTEC HOLDING GMBH, Hirschau (DE)

( * ) Notice: Subject to any disclaimer, the term of this patent is extended or adjusted under 35 U.S.C. 154(b) by 96 days.

(21) Appl. No.: 16/301,977

(22) PCT Filed: May 29, 2017

(86) PCT No.: PCT/EP2017/062903
§ 371 (c)(1),
(2) Date: Nov. 15, 2018

(87) PCT Pub. No.: WO2017/207494
PCT Pub. Date: Dec. 7, 2017

(65) Prior Publication Data
US 2019/0284074 A1 Sep. 19, 2019

(30) Foreign Application Priority Data

Jun. 2, 2016 (DE) .......................... 102016110191.5
Aug. 19, 2016 (DE) .......................... 102016115393.1

(51) Int. Cl.
*C02F 9/00* (2006.01)
*B01D 3/00* (2006.01)
(Continued)

(52) U.S. Cl.
CPC .............. *C02F 9/005* (2013.01); *B01D 3/007* (2013.01); *B01D 3/06* (2013.01); *B01D 3/10* (2013.01);
(Continued)

(58) Field of Classification Search
CPC ........ C02F 1/283; C02F 9/00; C02F 2303/04; C02F 3/302; C02F 2303/02; C02F 1/04;
(Continued)

(56) References Cited

U.S. PATENT DOCUMENTS 1,030,861 A * 7/1912 Reich .................... A61F 13/066
602/65
4,107,795 A * 8/1978 Carter .................... B60R 15/00
159/4.01

(Continued)

FOREIGN PATENT DOCUMENTS

DE 4332762 C1 10/1994 ................ C02F 1/28
DE 10152751 A1 5/2003 ............... B01D 5/00
(Continued)

OTHER PUBLICATIONS

The Notification Concerning Transmittal of International Preliminary Report on Patentability (Chapter I of the Patent Cooperation Treaty), in English, dated Dec. 13, 2018, which was issued by the International Bureau of WIPO in Applicant's corresponding international PCT application having Serial No. PCT/EP2017/062903, filed on May 29, 2017.
(Continued)

*Primary Examiner* — Ana M Fortuna
(74) *Attorney, Agent, or Firm* — Bodner & O'Rourke, LLP; Gerald T. Bodner; Christian P. Bodner

(57) ABSTRACT

The invention relates to a method for treating organically contaminated wastewater and/or organically contaminated wet waste, in particular for treating sanitary wastewater (15)
(Continued)

in trains. According to the invention, the method comprises the following steps: a) purifying the organically contaminated wastewater and/or the organically contaminated wet waste, in particular the sanitary wastewater (15) in trains, in a bioreactor (20), b) feeding the wastewater (24) at least partially purified in the bioreactor (20) into a conditioning plant (30), c) at least partial phase separation of the partially purified wastewater (24) in the conditioning plant (30), d) obtaining a liquid portion and a solid portion of the at least partially purified wastewater (24).

12 Claims, 2 Drawing Sheets

(51) Int. Cl.
| | | |
|---|---|---|
| | *B01D 3/10* | (2006.01) |
| | *B01D 35/00* | (2006.01) |
| | *B01D 3/34* | (2006.01) |
| | *B01D 3/06* | (2006.01) |
| | *C02F 1/04* | (2006.01) |
| | *C02F 1/16* | (2006.01) |
| | *C02F 1/32* | (2006.01) |
| | *C02F 1/467* | (2006.01) |
| | *C02F 1/52* | (2006.01) |
| | *C02F 1/66* | (2006.01) |
| | *B61D 35/00* | (2006.01) |
| | *C02F 3/30* | (2006.01) |
| | *C02F 101/16* | (2006.01) |
| | *C02F 103/00* | (2006.01) |
| | *C02F 1/02* | (2006.01) |

(52) U.S. Cl.
CPC .......... *B01D 3/346* (2013.01); *B61D 35/007* (2013.01); *C02F 1/02* (2013.01); *C02F 1/048* (2013.01); *C02F 1/16* (2013.01); *C02F 1/32* (2013.01); *C02F 1/4672* (2013.01); *C02F 1/52* (2013.01); *C02F 1/66* (2013.01); *C02F 3/30* (2013.01); *C02F 2101/16* (2013.01); *C02F 2103/005* (2013.01); *C02F 2201/001* (2013.01); *C02F 2209/02* (2013.01); *C02F 2209/03* (2013.01); *C02F 2209/42* (2013.01); *C02F 2301/063* (2013.01); *C02F 2303/04* (2013.01); *C02F 2303/08* (2013.01); *C02F 2303/12* (2013.01); *C02F 2303/22* (2013.01); *C02F 2303/24* (2013.01)

(58) Field of Classification Search
CPC .... C02F 3/082; C02F 1/02; C02F 1/66; C02F 2201/001; C02F 1/048; C02F 1/32; C02F 3/30; Y02W 10/15; Y02W 30/43; Y02W 10/37; B01D 2311/04; A23C 21/00
See application file for complete search history.

(56) References Cited

U.S. PATENT DOCUMENTS

| | | | | |
|---|---|---|---|---|
| 4,210,528 | A * | 7/1980 | Coviello | C02F 3/1242 |
| | | | | 210/195.1 |
| 2013/0130346 | A1* | 5/2013 | Hansen | C02F 3/00 |
| | | | | 435/167 |
| 2013/0153394 | A1* | 6/2013 | Wieser-linhart | C10G 1/10 |
| | | | | 201/4 |
| 2013/0167293 | A1 | 7/2013 | Nakaya | 4/321 |

FOREIGN PATENT DOCUMENTS

| | | | | |
|---|---|---|---|---|
| EP | 0551079 A1 | 7/1993 | | E03D 11/11 |
| WO | WO02102637 A1 | 12/2002 | | B61D 35/00 |

OTHER PUBLICATIONS

The English translation of the International Preliminary Report on Patentability (Chapter I of the Patent Cooperation Treaty), dated Dec. 4, 2018, which was issued by the International Bureau of WIPO in Applicant's corresponding international PCT application having Serial No. PCT/EP2017/062903, filed on May 29, 2017.
The Written Opinion of the International Searching Authority, in English, dated Aug. 28, 2017, which was issued by the International Bureau of WIPO in Applicant's corresponding international PCT application having Serial No. PCT/EP2017/062903, filed on May 29, 2017.
The International Search Report, in English, dated Aug. 28, 2017, which was issued by the International Bureau of WIPO in Applicant's corresponding international PCT application having Serial No. PCT/EP2017/062903, filed on May 29, 2017.

* cited by examiner

METHOD AND DEVICE FOR TREATING WASTEWATER CONTAINING ORGANIC MATTER AND/OR WET WASTE CONTAINING ORGANIC MATTER, IN PARTICULAR FOR TREATING SANITARY WASTEWATER IN TRAINS

The invention relates to method for treating organically contaminated wastewater and/or organically contaminated wet waste, in particular for treating sanitary wastewater in trains, in accordance with patent claim 1. Furthermore, the invention relates to a device for treating organically contaminated wastewater and/or organically contaminated wet waste, in particular for treating sanitary wastewater in trains, comprising a bioreactor, in which the organically contaminated wastewater and/or the organically contaminated wet waste, in particular the sanitary wastewater of a train, is at least partly purifyable pursuant to patent claim 12.

Wastewater from toilets and sinks in trains is mostly purified and clarified by a treatment within a bioreactor. The following is an example of the bioreactor of document DE 43 32 762 C1. Organic constituents of wastewater are largely degraded with the aid of such a bioreactor. Inorganic constituents such as copper and chloride ions remain in the wastewater. According to the current state of the art, the waste water is discharged after hygienisation onto the track bed. By using steel bodies in trains, the contact with the salts contained in the waste water is not disadvantageous. In such a variant of trains, there are no noteworthy problems due to corrosion.

However, more and more train components made from aluminium alloys are now being used. Salts contained in wastewater act on such aluminium alloys as corrosive and can lead to considerable damage. A coating of the aluminium body of a train does not provide a satisfactory solution to the problem, because the coating may for example be damaged by rockfalls, and by a correspondingly resulting crack in the coating, an intensive contact of the corrosive liquid with the body may occur at this point.

From the above, it is therefore the task of the present invention to specify an improved method for treating organically contaminated wastewater and/or organically contaminated wet waste, in particular for treating sanitary wastewater in trains.

A further task of the invention is to specify a device for the treatment of organically contaminated wastewater and/or organically contaminated wet waste, in particular for the treatment of sanitary wastewater in trains, wherein the further developed device shall in particular specify a method according to the invention.

This task is achieved by a method for treating organically contaminated wastewater and/or organically contaminated wet waste, in particular for the treatment of sanitary wastewater in trains, in accordance with the teaching of patent claim 1. Furthermore, the task of the invention is to be achieved by a device for treating organically contaminated wastewater and/or organically contaminated wet waste, in particular for treating sanitary wastewater in trains, comprising a bioreactor in which the organically contaminated wastewater and/or the organically contaminated wet waste, in particular the sanitary wastewater of a train, is at least partly purifyable pursuant to patent claim 12. The subclaims represent at least appropriate embodiments and further developments of the method or the device in accordance with the invention.

The method according to the invention is characterized by the following process steps:

a) purifying the organically contaminated wastewater and/or organically contaminated wet waste, in particular the sanitary wastewater in trains, in a bioreactor,
b) feeding the wastewater at least partially purified in the bioreactor in a conditioning plant,
c) at least partially phase separation of the partially purified wastewater in the conditioning plant,
d) obtaining a liquid portion and a solid portion of the at least partially purified wastewater.

The process steps according to the invention are preferably executed in the specified order a) to d). It is possible that further process steps are carried out between process steps a) to d). It is particularly possible that a plurality of process steps are executed parallel in time.

In pursuance to the method according to the invention, the organically contaminated wastewater and/or the organically contaminated wet waste, in particular the sanitary wastewater of a train, is purified or pre-purified in a bioreactor. With respect to the purification in a bioreactor, complete reference is made to the disclosure in document DE 43 32 762 C1. As is specified therein, the bioreactor can consist of at least three compartments. Therefore, it is possible that the wastewater to be purified in the bioreactor is subject to the following process steps:

separating the solid content and degradation of the solid content in a first compartment under predominantly aerobic conditions, transferring the liquid portion to a second compartment, in which a degradation takes place under predominantly anoxic conditions, and transferring the liquid portion from the second compartment into a third compartment, in which a degradation takes place under aerobic conditions.

Furthermore, it is possible that the bioreactor comprises merely two compartments so that the method according to the invention comprises in the bioreactor only two partial steps. In this case, it is possible that the wastewater to be purified is at first fed into a solids chamber. In this solids chamber, a first purification takes place, wherein the wastewater is subsequently fed into a liquids chamber. In such a liquids chamber, the roughly pre-purified wastewater may at first be stored temporarily before the at least partially purified waste water is fed into a conditioning plant.

In the conditioning plant, the partially purified wastewater can at least be partially separated with regard to the phases. Preferably a phase separation takes place with regard to the liquid phase and the solid phase.

The conditioning plant may comprise a vacuum evaporator so that the partially purified wastewater is concentrated in step c).

Following the phase separation or the concentration of the partially purified wastewater, the liquid portion and the solid portion may be obtained from the at least partially purified wastewater. Provided that the conditioning plant comprises a vacuum evaporator, a distillate and a concentrate may be obtained from the at least partially purified wastewater in step d).

The wastewater discharged from the bioreactor after treatment, i.e. the at least partially purified wastewater, comprises inorganic salts and small amounts of organic matter.

In addition to a vacuum evaporator, the conditioning plant preferably comprises further a vacuum circuit and/or a cooling/heating circuit and/or a concentrate circuit.

The conditioning plant, in particular the vacuum evaporator, is preferably operated at a temperature ranging from 20° C. to 100° C., in particular at a temperature ranging from 25° C. to 35° C. In other words, the at least partially purified water is fed into a vacuum evaporator, where it is concentrated at a temperature ranging from 20° C. to 100° C., in particular at a temperature ranging from 25° C. to 35° C.

In the conditioning plant, in particular in the vacuum evaporator, a vacuum of 4-12 kPa can be set, in particular of 4-6 kPa. In other words, a vacuum of 4-12 kPa or 40-120 mbar residual pressure, in particular 4-6 kPa or 40-60 mbar residual pressure, is applied in the vacuum evaporator. Due to the vacuum or the adjusted residual pressure, the boiling point of the partially purified wastewater can be reduced.

Organic acid and/or mineral acid may be admixed to the contaminated wastewater and/or to the contaminated wet waste, in particular to the sanitary wastewater in trains, and/or to the partially purified wastewater. In other words, upon entry or during entry into the bioreactor, organic acid and/or mineral acid may be added to the organically contaminated wastewater and/or the organically contaminated wet waste, in particular to the sanitary wastewater in trains.

In a further embodiment of the invention, it is possible that the organic acid and/or the mineral acid is added to the mixture in the bioreactor.

In another embodiment of the invention, it is possible that organic acid and/or mineral acid is added to the wastewater discharged from the bioreactor, which has been at least partially purified.

Again, it is possible that organic acid and/or mineral acid is added to the at least partially purified wastewater in the conditioning plant, in particular in the vacuum evaporator.

The organic acid is preferably citric acid and/or oxalic acid. The mineral acid can for example be sulphuric acid. The addition of small amounts of organic acids and/or mineral acids causes a reduction of the pH value of the at least partially purified wastewater. This means that the outgassing of ammonia during the distillation process is reduced or prevented as far as possible.

It is possible that the pH value of the organically contaminated wastewater and/or the organically wet waste, in particular the sanitary wastewater in trains, and/or the pH value of the at least partially purified wastewater, is monitored and adjusted to a pH value <5, in particular to a pH value of 4.5, by adding acid.

It is particularly possible that the pH value of the at least partially purified wastewater is monitored in the conditioning plant, in particular in the vacuum evaporator, and adjusted by adding acid. Also in this case, the pH value of the wastewater, which has been at least partially purified, is adjusted to a pH value <5, in particular to a pH value of 4.5.

The acid may in particular be organic acid and/or mineral acid, as already specified. The organic acid is in particular a citric acid and/or an oxalic acid. Mineral acid can for example be sulphuric acid.

The admixture or addition of acid shifts the pH value of the wastewater, in particular the partially purified wastewater, into the acidic range. This allows an almost ammonia-free distillate to be obtained.

If the at least partially purified wastewater contains ammonia, both ammonia gas and steam will be present in the gaseous phase in the vacuum evaporator. During the subsequent condensation process, ammonia dissolved in water would be present.

If, for example, sulphuric acid is added to the at least partially purified wastewater, ammonia is converted into ammonium sulphate:

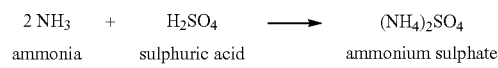

Ammonia is a basically gaseous chemical compound, since the boiling point is at −33° C. Ammonia is easily dissolved in water. Ammonium sulphate, on the other hand, is a salt present in the solid aggregate state. The melting point of ammonium sulfate is 235° C.

Provided the pH value of the at least partially purified wastewater is adjusted to 4.5, there will be no ammonia present in the at least partially purified wastewater but ammonium sulphate dissolved in water. The gas phase in the evaporator therefore comprises only water vapour and no longer comprises additional ammonia gas. The present water vapour condenses into simple water.

As a result, a significantly purified wastewater and a very good distillate quality can be achieved. The distillation of the at least partially purified wastewater results in a colorless product with reduced copper content and chloride. Due to the addition of acids, the ammonium content in the distillate is also considerably reduced. An almost ammonia-free distillate can be provided.

It is possible that the conditioning plant, in particular the vacuum evaporator, is supplied with waste heat from the bioreactor and that the partially purified wastewater is heated by means of the waste heat from the bioreactor. In other words, the heat generated in the bioreactor is used to pre-heat the partially purified wastewater in the conditioning plant, in particular in the vacuum evaporator. This enables an energy-saving operation of the evaporator.

In a further embodiment of the invention, it is possible that the liquid portion of the at least partially purified wastewater, in particular the distillate, is hygienised. Following its extraction by the conditioning plant, in particular by the vacuum evaporator, the distillate is stored in a distillate tank. The distillate can then be hygienised. A hygienisation can in particular be achieved by UV irradiation and/or pasteurization and/or anodic oxidation. Following an hygienisation, the distillate can for example be pumped out. In particular, it is possible that the distillate is discharged onto the track bed.

Furthermore, it is possible that the liquid portion of the at least partially purified wastewater, in particular the distillate, is transported to a train toilet and is used as a flushing liquid. In addition, it is possible that the liquid portion of the at least partially purified wastewater, in particular the distillate, is transported to a/the train sanitary installation, where it is used as service water, in particular as flushing liquid and/or washing liquid and/or cleaning fluid. In other words, the distillate may be collected and then returned to the sanitary circuit of a train. The liquid portion, in particular the distillate, can be caught, collected, recycled and returned to the sanitary wastewater circuit.

The solid portion of the at least partially purified wastewater, in particular the concentrate, can for example be collected over the service period of a train within the service interval and discharged and disposed of at the next service. Furthermore, it is possible that a condensate container or condensate collection container is completely replaceable and is regularly replaced by an empty concentrate container.

Due to the vacuum evaporation carried out, evaporation can be reduced to 1% to 40%, particularly to 5% to 40%, more particularly to 10% to 20% of the original wastewater volume, i.e. the volume of the at least partially purified wastewater. The wastewater volume that initially has a corrosive effect, namely the volume of the at least partially purified wastewater, can be significantly reduced. The corrosive effect is attenuated. The distillate weakened with regard to the corrosive effect can be discharged onto the track bed as usual, under certain circumstances after hygienisation has been carried out. Parts of the train body which are made of an aluminum alloy, will not be damaged by the liquid.

In an embodiment of the invention, it is possible that the method in accordance with the invention is executed at intervals. In this respect, it is particularly possible to operate the conditioning plant, in particular the evaporator, more particularly the vacuum evaporator, at intervals. For this purpose, the at least partially purified wastewater is first of all collected in a liquids chamber of the bioreactor. The contents of the liquids chamber is not completely vaporised. In fact, it is possible that in each operation of the device in accordance with the invention, particularly the conditioning plant, more particularly the vacuum evaporator, only a certain amount of the at least partially purified wastewater is distilled in the liquids chamber. Within 90 days, approx. 9,000 liters of wastewater are produced for a train toilet. Ideally, i.e. according to the calculated solubility of the salts, the concentrate can be retained in the evaporator for 90 days. Preferably, the original volume of wastewater is reduced to 1%.

According to a further embodiment of the invention, the at least partial phase separation of the partially purified wastewater can be effected in step c) by a precipitation process. Accordingly, step d), namely the recovery of a liquid portion and a solid portion of the at least partially purified wastewater, can be carried out downstream.

Another aspect of the invention is directed to a device for treating organically contaminated wastewater, and/or organically contaminated wet waste, in particular for treating sanitary wastewater in trains, comprising a bioreactor, in which the organically contaminated wastewater and/or the organically contaminated wet waste, in particular the sanitary wastewater of a train, is at least partially purifiable.

The device is particularly adapted for implementing the method according to the invention for treating organically contaminated wastewater and/or organically contaminated wet waste, in particular for treating sanitary wastewater in trains. The device for treating organically contaminated wastewater and/or organically contaminated wet waste, in particular for treating sanitary wastewater in trains, is particularly adapted for implementing a method according to one of the claims 1 to 11.

According to the invention, the device comprises a conditioning plant downstream of the bioreactor, in which the at least partially purified wastewater is at least partly separable with regard to the phases. Preferably, the wastewater can be separated with regard to the liquid phase and the solid phase.

The conditioning plant preferably comprises a vacuum evaporator. It is also possible that the conditioning plant is a vacuum evaporator. The vacuum evaporator preferably comprises a boiling chamber on the one hand and a condensate chamber on the other hand. Preferably heating serpentines run through the boiling chamber. The vacuum evaporator can also be fitted with a heating jacket to heat or warm the partially purified wastewater in the boiling chamber.

In a further embodiment of the invention, the conditioning plant can comprise a distillate tank, which is connected to a hygienisation device of the bioreactor and/or to a storage tank of the train sanitary installation. The storage tank of a train sanitary installation may for example be a flushing liquid tank of a train toilet. In addition, it is possible that the storage tank is a service water storage tank of a train sink.

In the vacuum evaporator, there can a foam trap and/or a dosing device for anti-foaming agents be formed. The foam trap is formed in particular below a condensate chamber.

Furthermore, it is possible that the device for treating organically contaminated wastewater comprises a pH value monitoring unit. It is particularly provided that such a pH value monitoring unit be included in the conditioning plant. Alternatively, it is possible that such a pH value monitoring unit is formed in the bioreactor.

In a particularly preferred embodiment of the invention, the pH value monitoring unit is formed in the vacuum evaporator.

Furthermore, the device for treating organically contaminated wastewater and/or organically contaminated wet waste preferably comprises an acid adding unit. This unit may be formed in the conditioning plant, more preferably in the vacuum evaporator. As an alternative or in addition, it is possible that such an acid adding unit be formed in the bioreactor.

The acid adding unit preferably receives data from the pH value monitoring unit. Depending from the measured pH value or the organically contaminated wastewater and/or the organically contaminated wet waste, in particular the at least partially purified wastewater, acid is added to the organically contaminated wastewater and/or to the organically contaminated wet waste, in particular to the at least partially purified wastewater. The acid adding unit preferably adds such an amount of acid that a pH value of preferably <5, in particular of 4.5 is set.

In a further embodiment of the invention, the evaporator, in particular the vacuum evaporator may comprise a scraping mechanism. The scraping mechanism may also be referred to as scraper. Such a scraper or such a scraping mechanism has the advantage that any build-up inside the evaporator, especially inside the vacuum evaporator, can be scraped off and transported via a concentrate discharge from the evaporator, in particular the vacuum evaporator. Provided that the evaporator, in particular the vacuum evaporator comprises a scraping mechanism, the evaporator, in particular the vacuum evaporator, comprises no heating serpentines. In this case, the evaporator, in particular the vacuum evaporator, will be heated via a heating jacket.

It is possible that the conditioning plant comprises a vacuum evaporator as well as a vacuum circuit and/or a cooling/heating circuit and/or a concentrate circuit.

The vacuum circuit for example comprises a Venturi nozzle and a water jet pump. In addition, the specified distillate tank can preferably be formed in the vacuum circuit.

The cooling/heating circuit preferably comprises a cooling device, in particular an air cooling device, and/or a refrigerant compressor.

In the concentrate circuit, wherein preferably a concentrate tank is formed, there is additionally preferably a concentrate pump provided. The concentrate tank serves as waste container, which can be emptied or replaced at regular intervals.

The device in accordance with the invention shall comprise at least one bioreactor and at least one conditioning plant, wherein the conditioning plant preferably comprises a vacuum evaporator.

The device, i.e. the arrangement of at least one bioreactor and at least one conditioning plant, preferably comprising at least one vacuum evaporator, of such a compact design that it can be integrated in a train. In other words, the device in accordance with the invention is preferably characterized by a compact design and integration into a train.

In the following, schematic diagrams are used to illustrate devices in accordance with the invention for treating organically contaminated wastewater and/or organically contaminated wet waste, in particular for treating sanitary wastewater in trains.

These show the following:

Figure 1:
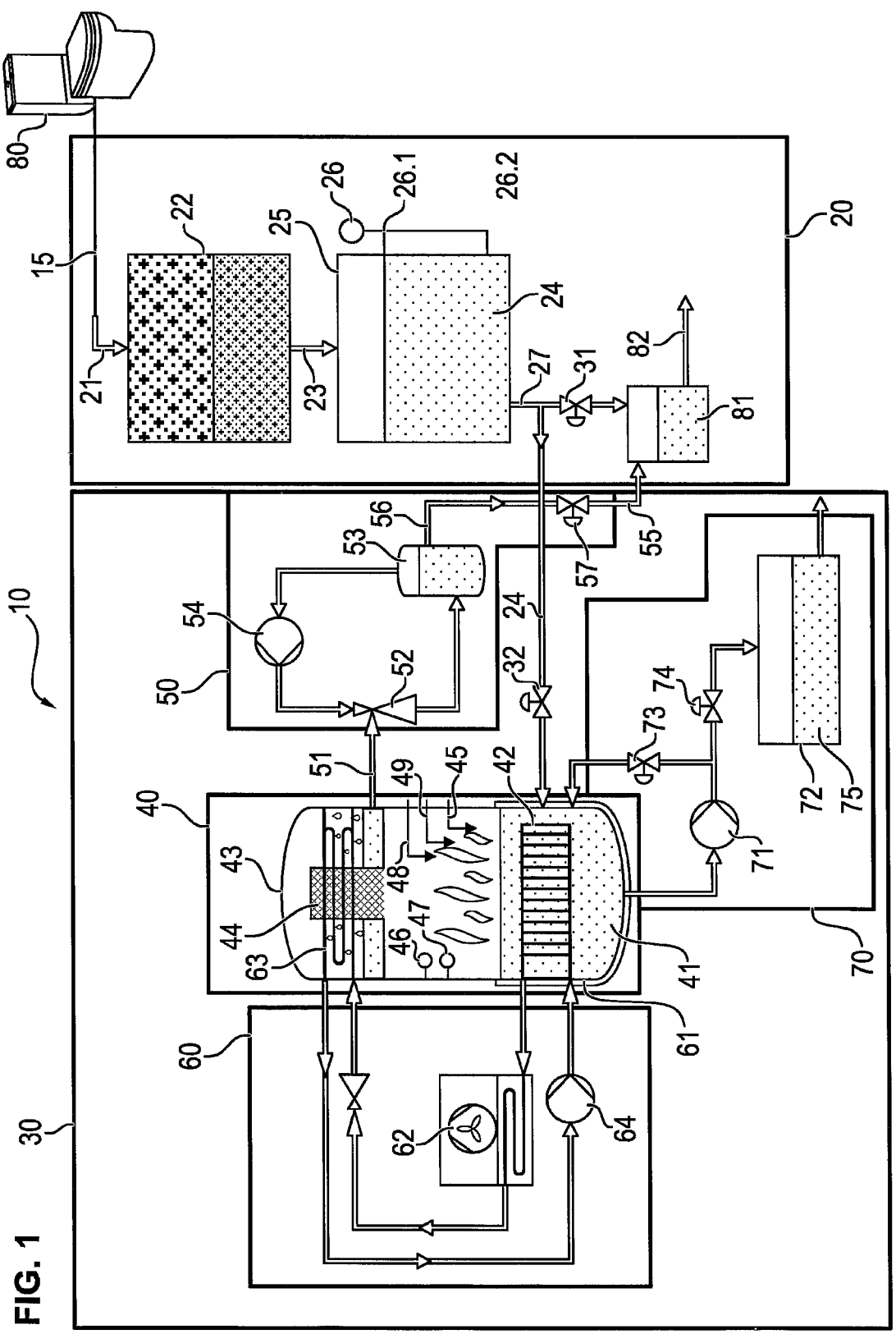
FIG. 1 is a basic design of a device according to the invention.

The device 10 in accordance with the invention for implementation of the method in accordance with the invention for treating organically contaminated wastewater and/or organically contaminated wet waste pursuant to FIG. 1 comprises in principle two plants or components. These are the bioreactor 20 and the conditioning plant 30.

In the present case, sanitary wastewater 15, in particular toilet wastewater of a train toilet 80 is fed into the bioreactor 20 through the inlet 21. The bioreactor 20 comprises a solids chamber 22. By means of the solids chamber 22, coarse contamination and the more solid components of the toilet wastewater are filtered. Through an outlet 23, the partially purified wastewater 24 enters the liquids chamber 25.

A sensor system 26 is formed in the liquids chamber 25. At a liquid level detected by the upper sensor 26.1, the vacuum evaporator 40 of the conditioning plant 30 is switched on. If the liquids chamber 25 is only filled up to sensor 26.2, the vacuum evaporator 40 is switched off. Via the outlet 27, the partially purified wastewater 24 enters the vacuum evaporator 40.

The vacuum evaporator 40 has a boiler shape, wherein in the lower part of the boiler, a boiling chamber 41 is formed. Heating serpentines 42 are running in this boiling chamber 41. Also recognizable is a heating jacket 61, which belongs to the cooling/heating circuit 60.

The conditioning plant 30 comprises in addition to the vacuum evaporator 40 a vacuum circuit 50, a cooling/heating circuit 60 as well as a concentrate circuit 70.

The vacuum evaporator 40 is preferably operated at a temperature of 20° C. up to 100° C., in particular at a temperature of 25° C. to 35° C. The temperature is set by means of the cooling/heating circuit 60. The cooling/heating circuit 60 comprises in addition to the heating jacket 61 an air cooling device 62 as well as cooling coils 63 running inside the vacuum evaporator 40. In the cooling/heating circuit 60 there is also a refrigerant compressor 64 formed. The cooling/heating circuit 60 thus contains a liquid separated from the partially purified wastewater 24.

In the vacuum evaporator 40, a foam trap 44 is formed in addition to a condensate chamber 43. Furthermore, a dosing device 45 for dosing anti-foaming agents is formed in the vacuum evaporator 40.

Furthermore, the boiler of the vacuum evaporator 40 contains a number of sensors. These are for example a pressure sensor 46 and a foam sensor 47. Furthermore, it is possible that a temperature sensor be formed.

In addition, a compressed air supply 48 and a high-pressure nozzle 49 are preferably provided in the vacuum evaporator 40. The vacuum evaporator 40 separates the at least partially purified wastewater 24 into a distillate and a concentrate. The at least partially purified wastewater 24 comprises inorganic salts and small amounts of organic matter. For example, the wastewater 24 may comprise copper and chloride ions. Preferably, a vacuum of 4 to 12 kPa, in particular a vacuum of 4 to 6 kPa, prevails in the vacuum evaporator 40 during the cleaning process.

The vacuum circuit 50 is designed for regulating the vacuum. The condensate built in the condensate chamber 43 flows into the vacuum circuit 50. For this purpose, a drain 51 is formed. Furthermore, in the vacuum circuit 50, there is a Venturi nozzle 52, a distillate/vacuum tank 53 as well as a water jet pump 54 formed. The condensate/distillate is collected in the tank 53. With the help of the valve 57, it is possible to control the supply of the distillate 55 into the hygienising device 81 via the outlet 56 of the vacuum circuit 50.

Subsequently, the distillate 55 can be transported into a hygienising device. This is done via the outlet 56. The hygienising device may be a UV irradiation device, a pasteurizing device or an anodic oxidation device.

Starting from the hygienising device 81, the hygienised distillate 82 can be transported in the direction of the train toilet 80. The hygienised distillate 82 can be used as flushing liquid for the train toilet 80. It is also possible that the hygienised distillate 82 is discharged onto the track bed.

The distillate 55 is purified with regard to salts. The distillate thus contains no copper and chloride ions. The distillate 55 is non-corrosive with respect to an aluminium body of the train. The distillate 55 can thus be pumped onto the track bed without having to pass through the hygienising device 81. The distillate 55 can come into contact with the aluminum body without the risk of corrosion.

The concentrate circuit 70 which is also illustrated comprises a concentrate pump 71 as well as a concentrate tank 72. Depending on the valve positions of the valves 73 and 74, the concentrate pump 71 can allow the circulation of the concentrate in the area of the boiling chamber 41 of the vacuum evaporator 40. If the valve 74 is opened and the valve 73 is closed, the concentrate is pumped by means of the concentrate pump 71 into the concentrate tank 72. The concentrate 75 is collected over the service period of the train in the service interval and discharged or disposed of at the next service. Furthermore, it is possible to replace the entire condensate tank with the concentrate 75 inside.

By means of the valves 31 and 32, the device in accordance of the invention is controllable such that the partially purified wastewater 24 does not necessarily have to be cleaned in the conditioning plant 30. If the valve 31 is open and the valve 32 closed, the partially purified wastewater 24 can, for example, be fed directly into the hygienising device 81 with a low contamination level.

Figure 2:
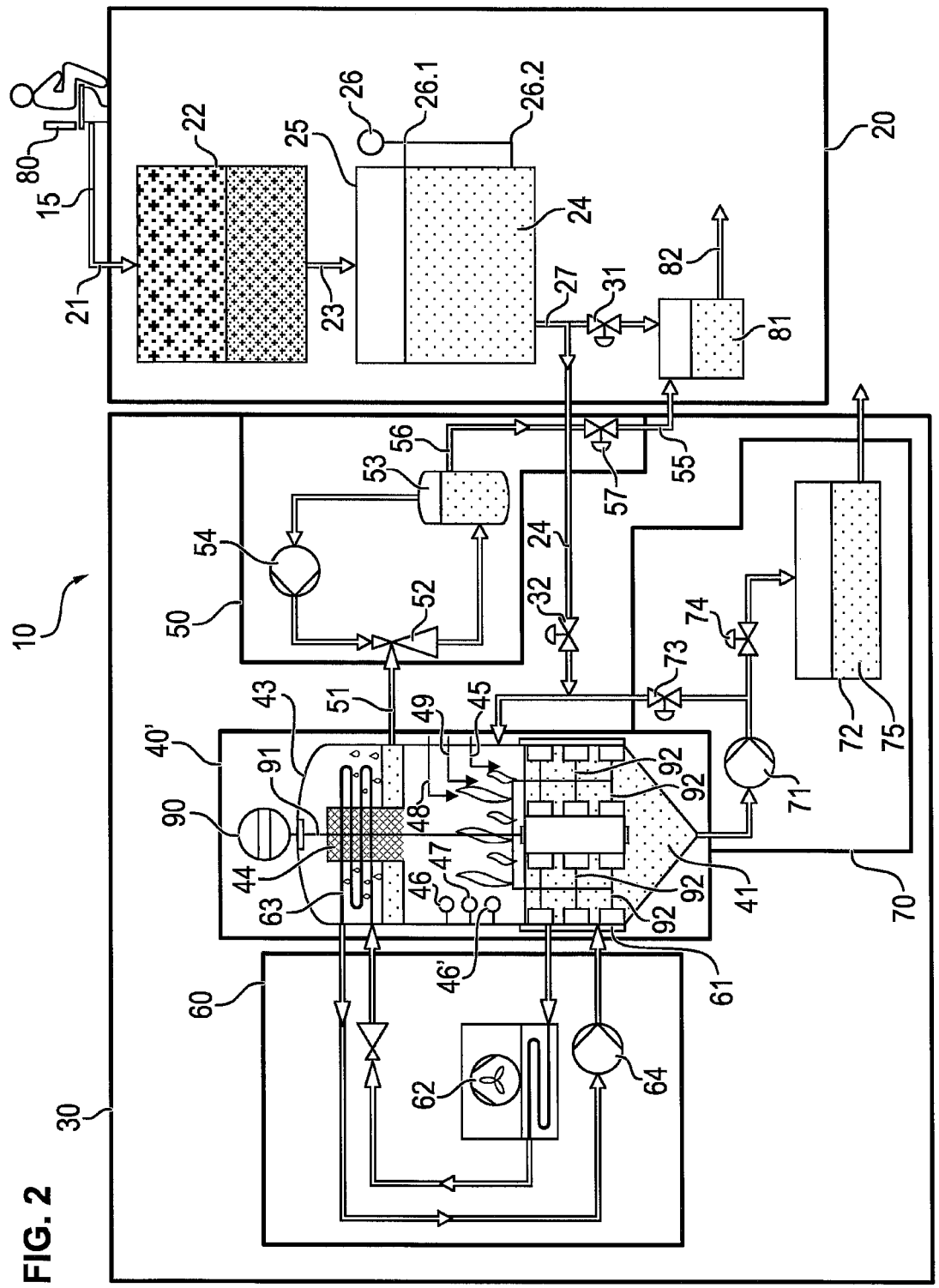
FIG. 2 is a further embodiment of a device in accordance with the invention with a further developed evaporator.

FIG. 2 illustrates a further device 10 for implementation of the method 10 for treating organically contaminated wastewater and/or organically contaminated wet waste. This device 10 in principle comprises, as already shown in FIG. 1, two plants or components. These are also the bioreactor 20 as well as the conditioning plant 30. Only the vacuum evaporator 40' in the embodiment shown in FIG. 2 has different design features than the vacuum evaporator 40 shown in FIG. 1.

First it can be seen that in the vacuum evaporator 40' a foam trap 44 is formed in addition to a condensate chamber 43. Furthermore, the vacuum evaporator 40' has a dosing device 45 for dosing anti-foaming agents.

Furthermore, the boiler of the vacuum evaporator 40' contains a number of sensors. These are for example a pressure sensor 46 and a foam sensor 47.

Furthermore, a level sensor 46' is formed. Moreover, it is possible that a temperature sensor be formed. The level sensor 46' could also be formed within the vacuum evaporator 40 of FIG. 1.

The vacuum evaporator 40' furthermore comprises a scraping mechanism 90. The scraping mechanism consists of a rod 91 at which the individual scraping arms 92 are located. Such a scraping mechanism or such a scraper system has the advantage that any build-ups inside the vacuum evaporator 40' can be scraped off and transported via the concentrate pump 71 into the concentrate tank 72.

Due to the formation of scraping arms 92, no heating serpentines can be formed in the vacuum evaporator 40'. The vacuum evaporator 40' is only heated via the heating jacket 61.

With respect to the further elements of the device 10' illustrated in FIG. 2, reference is made to the explanations made with respect to FIG. 1.

REFERENCE NUMERALS 10 device
15 sanitary wastewater
20 bioreactor
21 inlet
22 solids chamber
23 outlet
24 partially purified wastewater
25 liquids chamber
26 sensor system
26.1, 26.2 sensor
27 outlet
30 conditioning plant
31 valve
32 valve
40, 40' vacuum evaporator
41 boiling chamber
42 heating serpentine
43 condensate chamber
44 foam trap
45 dosing device
46 pressure sensor
46' level sensor
47 foam sensor
48 compressed air supply
49 high pressure nozzle
50 vacuum circuit
51 drain
52 Venturi nozzle
53 distillate/vacuum tank
54 water jet pump
55 distillate
56 outlet
57 valve
60 cooling/heating circuit
61 heating jacket
62 air cooling device
63 cooling coils
64 refrigerant compressor
70 concentrate circuit
71 concentrate pump
72 concentrate tank
73 valve
74 valve
75 concentrate
80 train toilet
81 hygienising device
82 hygienised distillate
90 scraping mechanism
91 rod
92 scraping arm

The invention claimed is:

1. Method for treating sanitary wastewater (15) in trains, characterized by
   a) purifying the sanitary wastewater (15) in a bioreactor (20),
   b) feeding the wastewater (24), at least partially purified in the bioreactor (20), into a conditioning plant (30),
   c) at least partial phase separation of the partially purified wastewater (24) in the conditioning plant (30),
   d) obtaining a liquid portion and a solid portion of the at least partially purified wastewater (24), whereby
      the conditioning plant comprises a vacuum evaporator (40) and in step c) the partially purified wastewater (24) is concentrated and the vacuum evaporator (40), is operated at a temperature of 25° C. to 35° C., wherein the vacuum evaporator (40) is supplied with waste heat from the bioreactor (20) and the partially purified wastewater (24) is heated by means of the waste heat from the bioreactor (20) and
      the liquid portion of the at least partially purified wastewater (24) is transported to a train sanitary installation and used as service water.

2. Method according to claim 1, characterized in that in step d) a distillate (55) and a concentrate (75) are obtained from the at least partially purified wastewater (24).

3. Method according to claim 2, characterized in that the liquid portion of the at least partially purified wastewater (24) is hygienised, by UV irradiation and/or pasteurization and/or anodic oxidation.

4. Method according to claim 1, characterized in that a vacuum of 4 to 12 kPA is set in the vacuum evaporator (40).

5. Method according to claim 1, characterized in that organic acid and/or mineral acid is admixed to the sanitary wastewater (15) in trains, and/or the partially purified wastewater (24).

6. Method according to claim 1, characterized in that the pH value of the at least partially purified wastewater (24) is monitored and adjusted to a pH value <5 by adding acid.

7. Method according to claim 6, characterized in that the pH value of the at least partially purified wastewater (24) is monitored in the vacuum evaporator and adjusted by adding acid.

8. Device (10) for treating sanitary wastewater (15) in trains according to claim 1, comprising a bioreactor (20) in which the sanitary wastewater (15) of a train, is at least partially purifyable, characterized by a conditioning plant (30) which is installed downstream of the bioreactor (20) and in which the at least partially purified wastewater (24) is at least partially separable with respect to the phases, whereby
    the conditioning plant (30) comprises a vacuum evaporator (40, 40') and has a compact design and is integrated into a train.

9. Device (10) according to claim 8, characterized in that the conditioning plant (30) comprises a distillate tank (53) which is connected to the hygienising device (81) of the bioreactor (20) and/or to a storage tank of a train sanitary installation.

10. Device (10) according to claim 8, characterized in that a foam trap (44) and/or a dosing device (45) for anti-foaming agents is formed in the vacuum evaporator (40, 40').

11. Device (10) according to claim 8, characterized in that the vacuum evaporator (40') comprises a scraping mechanism (90).

12. Device (10) according to claim 8, characterized in that the vacuum evaporator (40, 40') comprises a pH monitoring unit and an acid adding unit.

\* \* \* \* \*